United States Patent
Blandy et al.

(10) Patent No.: US 6,412,108 B1
(45) Date of Patent: Jun. 25, 2002

(54) METHOD AND APPARATUS FOR SPEEDING UP JAVA METHODS PRIOR TO A FIRST EXECUTION

(75) Inventors: Geoffrey Owen Blandy; Bentley John Hargrave, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/306,194

(22) Filed: May 6, 1999

(51) Int. Cl.$^7$ ................................................. G06F 9/45
(52) U.S. Cl. ........................................ 717/152; 717/151
(58) Field of Search ........................... 717/9, 4, 5, 152, 717/151, 153, 154, 166

(56) References Cited

U.S. PATENT DOCUMENTS

| | | | | |
|---|---|---|---|---|
| 5,905,895 A | * | 5/1999 | Halter | 395/709 |
| 5,987,256 A | * | 11/1999 | Wu et al. | 395/707 |
| 6,081,665 A | * | 6/2000 | Nilsen et al. | 395/705 |
| 6,223,202 B1 | * | 4/2001 | Bayeh | 709/102 |
| 6,233,733 B1 | * | 5/2001 | Ghosh | 717/7 |

OTHER PUBLICATIONS

Goldberg. A Specification of Java Loading and Bytecode Verification. ACM. 1998. pp. 49–58.*
Hsueh et al. Optimizing NET Compilers for Improved Java Performance. IEEE. 1997. pp. 67–75.*

* cited by examiner

Primary Examiner—Tuan Q. Dam
Assistant Examiner—Wei Zhen
(74) Attorney, Agent, or Firm—Duke W. Yee; Jeffrey S. LaBaw

(57) ABSTRACT

A method and apparatus for optimizing performance of a method. A method is loaded and verified in a virtual machine. Prior to execution of the method, elements of the method are analyzed for optimization according to a policy. Responsive to identifying elements that can be optimized according to the policy, the elements are optimized following the policy and the method is then executed.

20 Claims, 3 Drawing Sheets

METHOD AND APPARATUS FOR SPEEDING UP JAVA METHODS PRIOR TO A FIRST EXECUTION

BACKGROUND OF THE INVENTION

1. Technical Field

The present invention relates to an improved data processing system and in particular to a method and apparatus for executing a method. Still more particularly, the present invention relates to a method and apparatus for speeding up execution of a method.

2. Description of Related Art

Java is an object oriented programming language and environment focusing on defining data as objects and the methods that may be applied to those objects. "Java" is a trademark of Sun Microsystems, Inc. Java supports only a single inheritance, meaning that each class can inherit from only one other class at any given time. Java also allows for the creation of totally abstract classes known as interfaces, which allow the defining of methods that may be shared with several classes without regard for how other classes are handling the methods. Java provides a mechanism to distribute software to different computing platforms.

Java is able to support applications for many types of data processing systems, which may contain a variety of central processing units and operating system architectures. The Java Virtual Machine (JVM) is a virtual computer component that resides only in memory. The JVM allows Java programs to be executed on different platforms as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format. The compiled code is executable on many processors, given the presence of the Java runtime system. The Java compiler generates bytecode instructions that are non-specific to particular computer architectures. A bytecode is a machine independent code generated by the Java compiler and executed by a Java interpreter. A Java interpreter is a module in the JVM that alternatively decodes and executes a bytecode or bytecodes. These bytecode instructions are designed to be easy to interpret on any machine and easily translated on the fly into native machine code.

A development environment, such as the Java Development Kit (JDK) available from Sun Microsystems, Inc., may be used to build Java bytecode from Java language source code and libraries. This Java bytecode may be stored as a Java application or applet on a Web Server, where it can be downloaded over a network to a user's machine and executed on a local JVM.

When extra speed in executing a Java program is needed, a Just In Time (JIT) compiler may be used to translate bytecodes for a method or class into native machine instructions before executing them. Typically, this compilation only occurs once per method. Some JIT compilers may compile entire classes, rather than one method at a time.

Bytecodes may be optimized for execution in a JVM. Presently, these optimizations occur during the runtime execution of bytecodes for a method. A number of problems exist with optimizing bytecodes during execution of the method. One problem associated with this type of technique is that a slight performance penalty is incurred during the execution of the method to perform the modification to the bytecode. This effect may be spread out over several invocations of the method since the bytecodes will only be modified as they are executed and different invocations will result in different code paths through the method being exercised. Thus, the execution speed of the method may vary depending upon whether or not the encountered bytecodes are being executed for the first time. Also, because each bytecode is optimized as it is encountered the setup and function call overhead must be incurred for each such optimization rather than a single time for multiple optimizations.

Some potential optimizations will require that a "code lock" be obtained on the method to ensure that no other thread is executing in the method. This requirement can be very expensive with respect to the overall performance of the JVM and thus may prevent these potential bytecode optimizations from being used. Finally, additional bytecodes are necessary to support optimizing to macro bytecodes. The interpreter has logic for the original bytecode to determine if a macro bytecode optimization is possible. If optimization to a macro bytecode is not possible, then the original bytecode must be converted to an alternate form of the original bytecode. The interpreter logic for the alternate form of the original bytecode performs the same function as the original bytecode but does not perform the test for possible macro bytecode optimization to avoid this check on future executions of this bytecode. This situation requires the use of additional bytecodes from the very limited pool of free bytecode values.

Therefore, it would be advantageous to have an improved method and apparatus for optimizing the execution of bytecodes without incurring the penalties of existing techniques for optimizing the execution of bytecodes.

SUMMARY OF THE INVENTION

The present invention provides a method and apparatus for optimizing performance of a method. A method is loaded and verified in a virtual machine. Prior to first execution of the method, elements of the method are analyzed for optimization according to a policy. Responsive to identifying elements that can be optimized according to the policy, the elements are optimized following the policy and the method is then made available for execution. All methods undergo these optimizations prior to execution and the interpreter is modified to process the new encodings of the bytecode streams.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
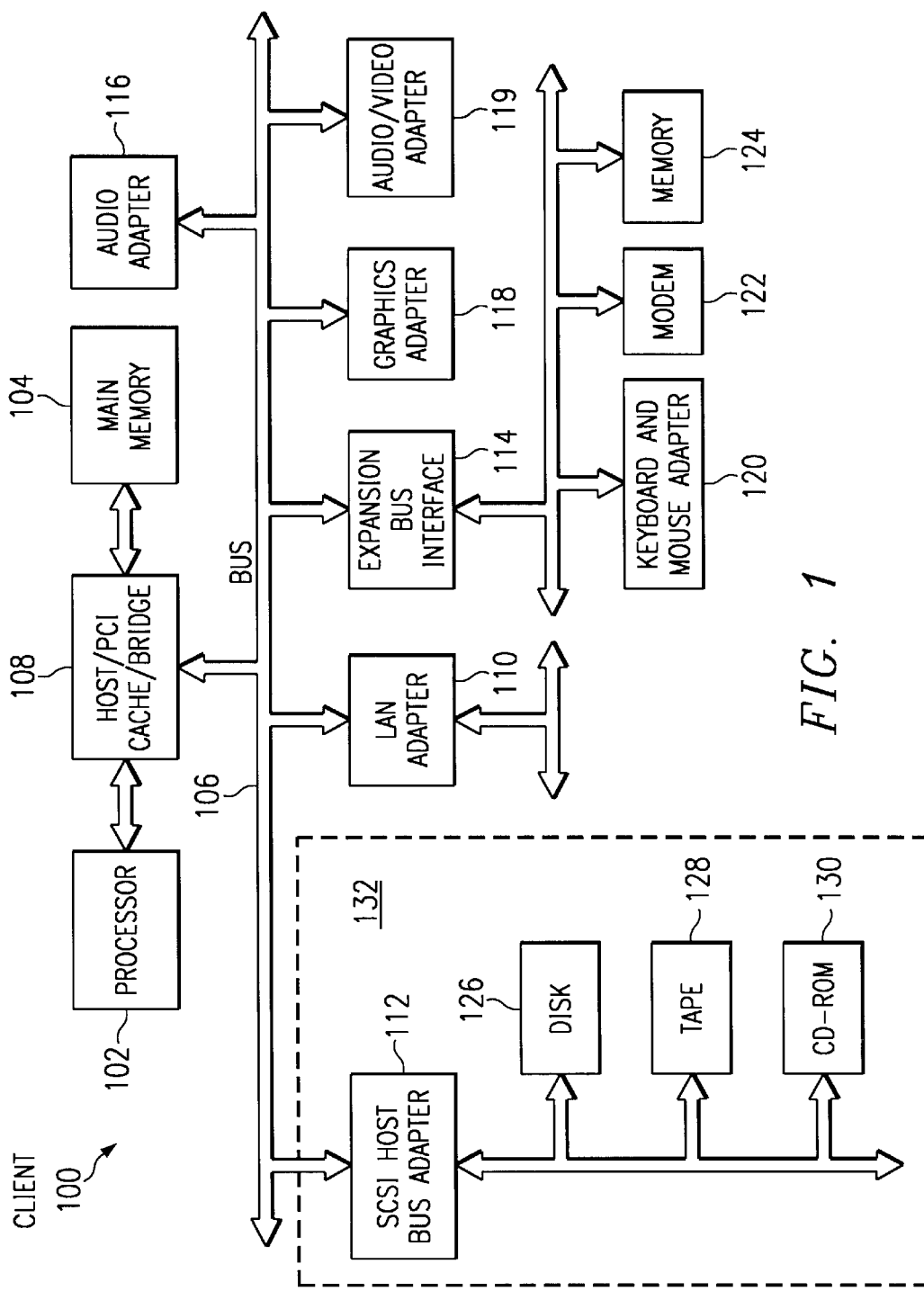
FIG. 1 is a block diagram illustrating a data processing system in which the present invention may be implemented.

With reference now to FIG. 1, a block diagram illustrates a data processing system in which the present invention may be implemented. Data processing system 100 is an example of a client computer. Data processing system 100 employs a peripheral component interconnect (PCI) local bus architecture. Although the depicted example employs a PCI bus, other bus architectures such as Micro Channel and ISA may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video adapter 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM drive 130. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 100. "Java" is a trademark of Sun Microsystems, Inc. Instructions for the operating system, the object-oriented operating system, and applications or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash ROM (or equivalent non-volatile memory) or optical disk drives and the like, may be used in addition to or in place of the hardware depicted in FIG. 1. Also, the processes of the present invention may be applied to a multiprocessor data processing system.

For example, data processing system 100, if optionally configured as a network computer, may not include SCSI host bus adapter 112, hard disk drive 126, tape drive 128, and CD-ROM 130, as noted by dotted line 132 in FIG. 1 denoting optional inclusion. In that case, the computer, to be properly called a client computer, must include some type of network communication interface, such as LAN adapter 110, modem 122, or the like. As another example, data processing system 100 may be a stand-alone system configured to be bootable without relying on some type of network communication interface, whether or not data processing system 100 comprises some type of network communication interface. As a further example, data processing system 100 may be a Personal Digital Assistant (PDA) device which is configured with ROM and/or flash ROM in order to provide non-volatile memory for storing operating system files and/or user-generated data.

The depicted example in FIG. 1 and above-described examples are not meant to imply architectural limitations.

The present invention provides a method, apparatus, and instructions used to optimize execution of bytecodes for Java methods. The present invention performs various types of bytecode optimizations on a Java method at class load time, but prior to the first execution. Class load time is when a Java class is loaded into the JVM. The process of the present invention examines the bytecodes of the method in a sequence from the beginning of the method to the end of the method. Opportunities for optimizations of bytecodes are identified and performed. The rules or determinations made to identify bytecodes for optimization are also referred to as a policy. This policy also is used in these examples to identify the optimization to be performed on identified bytecodes. After the method has been examined and any optimizations have been performed, the method is ready for the first execution. It is understood that corresponding changes to the JVM interpreter are required to support the various possible bytecode optimizations defined by the policy.

Figure 2:
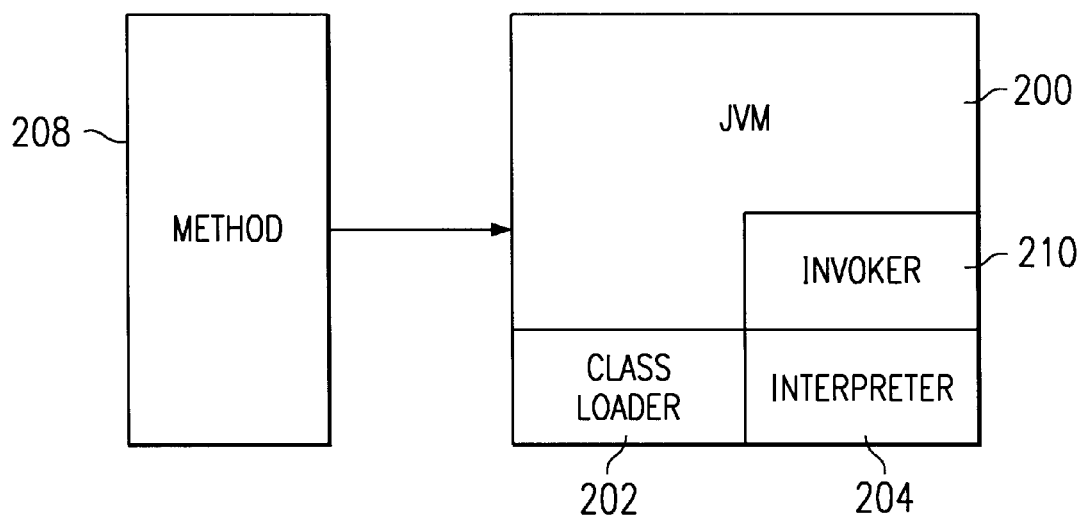
FIG. 2 is a block diagram of components used to process methods depicted in accordance with a preferred embodiment of the present invention.

With reference now to FIG. 2, a block diagram of components used to process methods are depicted in accordance with a preferred embodiment of the present invention. In the depicted example, JVM 200 includes a class loader 202, and an interpreter 204. JVM 200 will start execution by invoking a method of a specified class. In the depicted example, the method may be for example, main. The method may be passed as a single argument in the form of an array of strings. This causes the specified class to be loaded, linked to other types that it uses, and initialized. The loading of a class involves the finding of the binary form of a class or interface type of the particular name.

In the depicted example, the loading process is implemented by class loader 202. Class loader 202 in this example includes a ClassLoader class, which includes methods for loading new classes into the Java runtime environment. The class loader is an object responsible for loading classes. Given the name of a class, the class loader will attempt to locate or generate data that constitutes a definition for the class. Typically, a class loader will transform the name of a class into a file name and then read a "class file" of that name from a file system. This loading of the class file is part of a process that also includes linking and initialization. The loading is a process of bringing a binary form for a type into a JVM. In Java, variables and expressions have a type while objects and arrays have a class. Linking involves verification, preparation, and resolution. Verification insures that a type is properly formed and fit for use by the JVM. Preparation involves allocating memory needed by the type, while resolution is the process of transforming symbolic references in a constant pool to direct references. The constant pool is an ordered set of constants used by the type, including literals (string, integer, and floating point constants) and symbolic references to types, fields, and methods. Entries in a constant pool are referenced by an index, much like the elements of an array. In initialization, class variables are given their proper initial values. The processes of the present invention will perform bytecode optimizations after class loading and linking, but prior to initialization and the first execution of methods being optimized.

In this case, interpreter 204 contains the processes and data structures used to interpret bytecodes within method 208 for execution within the data processing system. The interpreter is directed by the bytecode to execute native code to perform the function indicated by the bytecode.

When interpreter 204 encounters an invoke bytecode, interpreter 204 will locate an appropriate method, such as method 208. Thereafter, the process will branch to invoker 210, which will perform the necessary setup for execution of method 208. Invoker 210 is the routine that performs the actual setup prior to passing control to the Java interpreter.

The present invention will perform the optimization checks prior to the first execution of the bytecodes of the method. A number of different types of bytecode optimizations may be performed. These optimizations can include, for example, endian conversion, specialized bytecodes, macro bytecodes, and calculating data about the method for use at runtime.

Endian conversion may be performed when bytecodes contain signed or unsigned 16- and 32-bit operands in big-endian order. For JVM's executing on little-endian processors (e.g., Intel X86), the present invention converts these operands to little-endian form, which simplifies the logic of the JVM interpreter and improves the execution speed of the bytecodes. Thus, the interpreter logic for all bytecodes with signed or unsigned 16- and 32-bit operands can assume that these operands are in the natural endian order of the system upon which the JVM is executing and do not require endian conversion.

In the case of specialized bytecodes, bytecodes can be replaced by specialized bytecodes which perform the same function in a more efficient manner. These specialized bytecodes can have different operands than the original bytecode, e.g., many loops have control logic using a conditional branch to negative displacement. If the displacement is between –225 and 0, then the conditional branch bytecode can be replaced with a specialized conditional branch bytecode having an operand consisting of the displacement operand from the original bytecode converted to a positive 8-bit value. This change results in a performance improvement for the loop since the operand of the specialized conditional branch bytecode is known to be positive and not require sign extension when loaded from the bytecode.

When several bytecode sequences occur very frequently, the first bytecode in the sequence can be replaced by a macro bytecode. A macro bytecode encompasses the function of all bytecodes in the sequence, e.g., iconst_1 followed by iadd. The bytecode iconst_1 pushes the integer constant 1 onto the operand stack while iadd results in the two top words of the operand stack being popped and then added together. The integer result is then pushed onto the operand stack. This sequence increments a value on the stack by one. The bytecode for iconst_1 can be replaced by the macro bytecode iconst_1_then_iadd which increments the value on the stack by one and continues execution following the iadd bytecode. The macro bytecode performs all the functions of the bytecodes in the sequence but only requires a single bytecode dispatch in the interpreter, thus improving performance.

Another optimization involves calculating a bitmask describing whether special treatment is required for parameters when calling the method from native code. This can be calculated once at class load time and referenced many times at runtime providing a runtime performance improvement. In some cases, a bytecode will reference the constant pool. Bytecodes that reference the constant pool can execute faster with a more rapidly accessible constant pool pointer. The bytecodes of the method are inspected for these bytecodes and, if present, the method is marked (actually a specialized invoker is selected), to use a variant of the standard javaframe which contains a copy of the constant pool pointer for the class. When a method so marked is invoked, the javaframe created for the method when it is called has a copy of the constant pool pointer placed in it. The interpreter logic for the bytecodes using the constant pool can now directly and rapidly reference the copy of the constant pool pointer in the javaframe. Previously, an indirect reference to the constant pool point is made from the method block pointed to by the javaframe.

Figure 3:
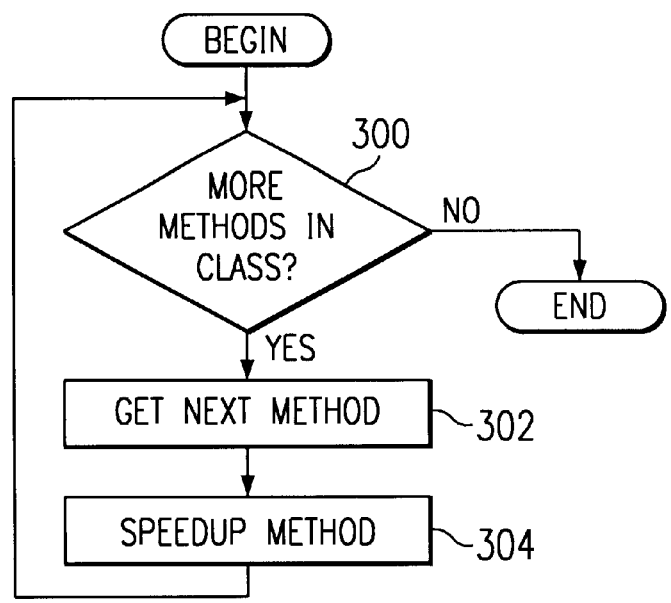
FIG. 3 is a flowchart of a method for speeding up methods in a class depicted in accordance with a preferred embodiment of the present invention.

With reference now to FIG. 3, a flowchart of a method for speeding up methods in a class is depicted in accordance with a preferred embodiment of the present invention. The process begins by determining whether more methods are present in the class for speeding up (step 300). If additional methods are present, the next unprocessed method is obtained (step 302). That method is then "speeded up" or optimized (step 304), in accordance with the policy, with the process then returning to step 300. When no additional methods are present for optimizing, the process terminates.

Figure 4:
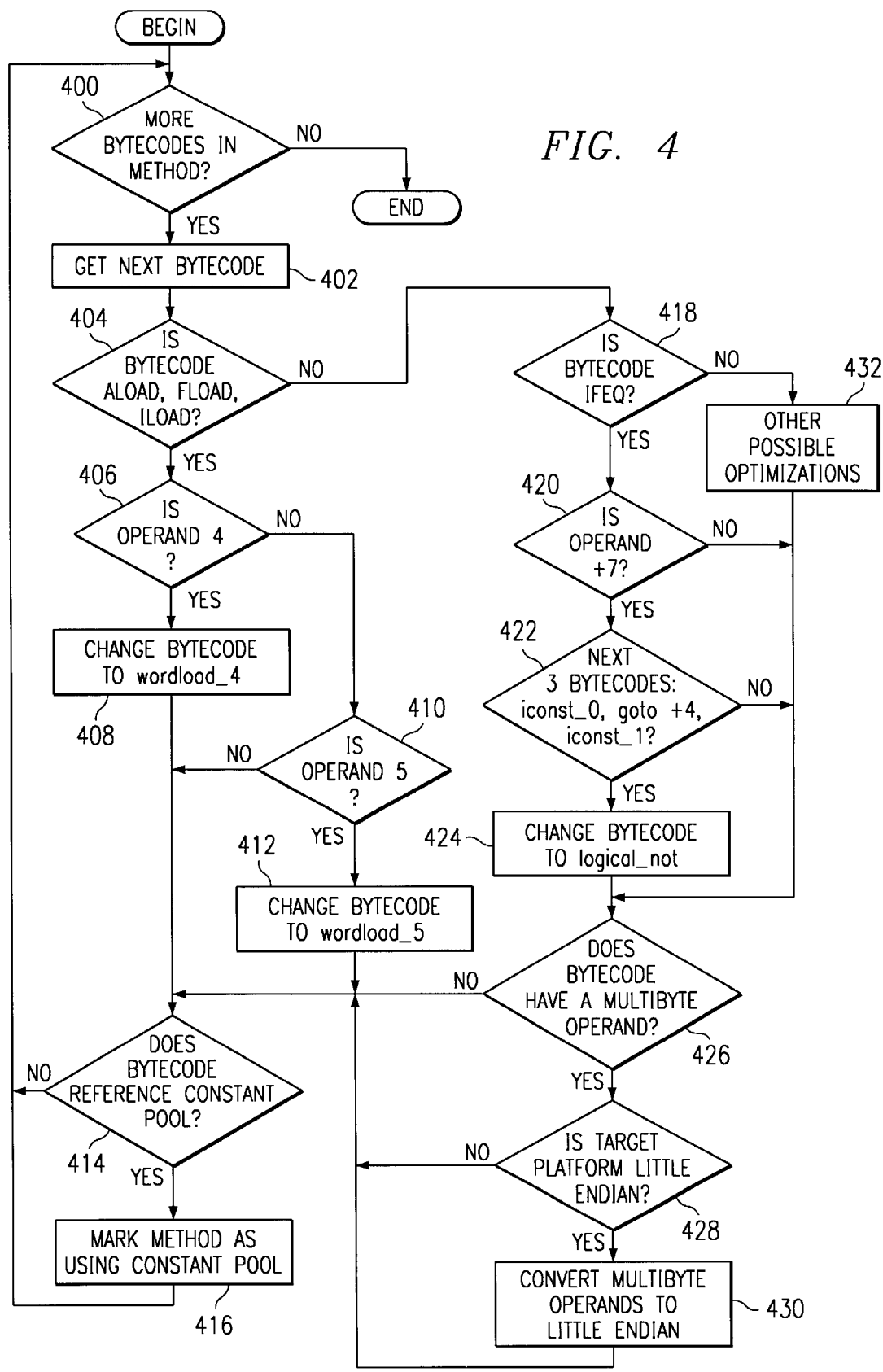
FIG. 4 is a flowchart of a speedup process for a method depicted in accordance with a preferred embodiment of the present invention.

With reference now to FIG. 4, a flowchart of a speedup process is depicted in accordance with a preferred embodiment of the present invention. The processes illustrated in FIG. 4 are more detailed explanations of step 304 in FIG. 3. The speedup process in FIG. 4 is used to perform various bytecode optimizations in accordance with an example optimization policy. The process begins by determining whether bytecodes remain to be examined (step 400). In step 400, the determination looks to see if there are additional bytecodes to examine in the method. If all bytecodes in the method have been examined the process terminates. Otherwise, the next bytecode in the method to be examined is obtained (step 402). The process will analyze bytecodes in a sequence from the beginning of the method to the end of the method. A determination is then made as to whether the bytecode is a a load, fload, or iload (step 404). The bytecode a load causes the JVM to push onto the operand stack the reference contained in a local variable word specified by the index operand. The bytecode fload is used to push on to the operand stack the fload value contained in the local variable word specified by the index operand. The bytecode iload is used to push onto the operand stack the int value contained in the local variable word specified by the index operand. If the bytecode is an a load, fload, or iload, a determination is then made as to whether the bytecode has an operand of 4 (step 406). If the operand is 4, the bytecode is then changed to a specialized bytecode wordload_4 (step 408). The specialized bytecode wordload_4 loads a word value from local variable 4 and pushes it onto the operand stack. The specialized bytecode wordload_4 implies a reference to local variable 4 and does not need to read the operand value to determine which local variable to reference, thus providing a performance improvement. On the other hand, if the operand is not a 4, a determination is then made as to whether the operand is a 5 (step 410). If the operand is a 5, the bytecode is then changed to a specialized bytecode wordload_5 (step 412). The specialized bytecode wordload_5 loads a word value from local variable 5 and pushes it onto the operand stack. The specialized bytecode wordload_5 implies a reference to local variable 5 and does not need to read the operand value to determine which local variable to reference, thus providing a performance improvement. Otherwise the process proceeds to step 414 as describe below. After step 408 or step 412, a determination is then made as to whether the bytecode references the constant pool (step 414). If the bytecode references the constant pool, the method is marked as using the constant pool (step 416) with the process then returning to step 400. Otherwise, the process returns directly to step 400 without further processing of the bytecode.

With reference again to step 404, if the bytecode is not an aload, fload, or iload, a determination is then made as to whether the bytecode is an ifeq (step 418). The bytecode ifeq removes the top word of the operand stack and causes a branch if it is equal to zero. If the bytecode is an ifeq, a determination is then made as to whether the operand for the bytecode is a +7 (step 420). If the operand is a +7, a determination is then made as to whether the bytecode sequence iconst_0, goto +4, iconst_1 follows the ifeq bytecode (step 422). If this condition is true, the process then changes the ifeq bytecode to the macro bytecode logical_ not (step 424). The logical_ not macro bytecode examines the value on the top of the operand stack. If the value is zero, the value on top of the operand stack is replaced with the value one, otherwise the value on top of the operand stack is replaced with the value zero. This macro bytecode performs the same function as the identified bytecode sequence (ifeq +7, iconst_1, goto +4, iconst_0) but only requires a single bytecode dispatch in the interpreter rather than four thus improving performance.

Thereafter, a determination is then made as to whether the bytecode has a multibyte operand (step 426). If a multibyte operand is present, a determination is then made as to whether the target platform is a little-endian platform (step 428). Many bytecodes contain signed or unsigned 16- and 32-bit values in a big-endian form. If the target platform is in a little-endian form, the multibyte operands are converted to a little-endian form (step 430) with the process then proceeding to step 414 as described above. With reference to step 428, if the target platform is not a little-endian platform, the process also proceeds to step 414. Similarly, in step 426 if a multibyte operand is absent, the process proceeds to step 414.

With reference again to step 418, if the bytecode is not an ifeq bytecode other possible optimizations are performed in accordance with the optimization policy (step 432) with the process then proceeding to step 426 as described above. Only a few possible optimizations have been described in FIG. 4 to provide an illustration of a possible optimization process for bytecodes to speed up execution of a method. The performance of these optimizations prior to execution of the method for the first time is a feature that avoids runtime penalties in speeding up a method. Of course, other optimizations may be performed on the bytecodes in addition to or in place of the ones described with reference to FIG. 4.

Thus, the present invention provides a method, apparatus, and instructions for speeding up Java methods that avoids runtime penalties. This advantage is provided by performing all optimizations at class load time before methods are first executed. Additionally, the interpreter is modified to process the new bytecode forms. Because all methods are preprocessed prior to execution, the interpreter requires no extra logic to decern between standard and optimized forms of bytecodes. For example, the interpreter can assume that all multibyte operands are in the natural endian order for the machine.

Because optimizations are performed only once and prior to execution, no code lock is required to insure the integrity of an opcode and its operand. In prior art systems, optimizations that involve the modification of a bytecode's opcode and operand(s) require techniques to ensure that another thread does not attempt to perform the same optimization using the already modified operand(s) of a concurrent optimization. The technique of the present invention also avoids the need for alternate forms of bytecodes without optimization checks because macro bytecode optimizations are performed prior to execution of the method and the logic for original bytecodes do not need to check for possible optimization. Because all bytecodes are processed in a single pass of the method, setup and function call overhead is reduced.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, although the depicted embodiment is directed towards processing bytecodes in Java, the processes of the present invention may be applied to other programming languages and environments that process instructions, which are non-specific to a computer on which the instructions are to be executed. In such a case, a virtual machine on the computer may interpret the instructions or send the instructions to a compiler to generate code suitable for execution by the computer in which the virtual machine is located. The embodiment was chosen and described in order to best explain the principles of the invention, the practical application, and to enable others of ordinary skill in the art to understand the invention for various embodiments with various modifications as are suited to the particular use contemplated.

What is claimed is:

1. A process for optimizing performance of a method, the process comprising the computer implemented steps of:

loading a verifying the method in a virtual machine;

prior to execution of the method, analyzing elements of the method for optimization responsive to identifying elements that can be optimized, optimizing the elements by identifying the method as a selected method that is to used a frame containing a constant pool pointer for a class of the method; and executing the method.

2. The process of claim 1, wherein the virtual machine is a Java virtual machine.

3. The process of claim 1, wherein the method comprises a plurality of bytecodes.

4. The process of claim 1, wherein the step of optimizing further comprises:

performing as endian conversion of bytecode values.

5. The process of claim 4, wherein the endian conversion converts values in big-endian order to values in little-endian order.

6. The process of claim 1, wherein the step of optimizing further comprises:

replacing selected bytecodes with specialized bytecodes.

7. The process of claim 1, wherein the step of optimizing further comprises:

replacing selected bytecodes with a macro bytecode which performs a function of the selected bytecodes and a function of a sequence of following bytecodes.

8. The process of claim 1, wherein the method includes a plurality of bytecodes and wherein the steps of optimizing further comprises:

identifying a bytecode sequence in which the first bytecode may be replaced with a macro bytecode, wherein the micro bytecode performs a function performed by the bytecode sequence.

9. The method of claim 1, wherein the elements are analyzed according to a policy.

10. A data processing system for optimizing performance of a method, the data processing system comprising:

loading means for loading and verifying the method in a virtual machine;

analyzing means, prior to execution of the method, for analyzing elements of the method for optimization;

identifying means, responsive to identifying elements that can be optimized, optimizing the elements by identifying the method as a selected method that is to use a frame containing a constant pool pointer for a class of the method; and executing means for executing the method.

11. The data processing system of claim 10, wherein the virtual machine is a Java virtual machine.

12. The data processing system of claim 10, wherein the method comprises a plurality of bytecodes.

13. The data processing system of claim 10, wherein the optimizing means further comprises:

performing means for performing as endian conversion of bytecode values.

14. The data processing system of claim 13, wherein the endian conversion converts values in big-endian order to values in little-endian order.

15. The data processing system of claim 10, wherein the optimizing means further includes:

replacing means for replacing selected bytecodes with specialized bytecodes.

16. The data processing system of claim 10, wherein the optimizing means further includes:

replacing means for replacing selected bytecodes with a macro bytecode which performs the function of the selected bytecodes and a function of a sequence of following bytecodes.

17. The data processing system of claim 10, wherein the method includes a plurality of bytecodes and wherein the optimizing means further includes:

identifying means for identifying a bytecodes sequence in which the first bytecode may be replaced with a macro bytecode, wherein the macro bytecode performs a function performed by the bytecode sequence.

18. The data processing system of claim 10, wherein the elements are analyzing by the analyzing means according to a policy.

19. A computer program product in a computer readable medium for optimizing performance of a method, the computer program product comprising:

first instructions for loading and verifying a method in a virtual machine;

second instruction, prior to execution of the method, for analyzing elements of the method for optimizing;

third instructions, responsive to identifying elements that can be optimized, for optimizing the elements by identifying the method as a selected method that is to use a frame containing a constant pool pointer for a class of the method; and fourth instructions for executing the method.

20. A data processing system for optimizing performance of a method, the data processing system comprising:

a bus system;

a memory connected to the bus system, wherein the memory includes a set of instructions; and a processing unit connected to the bus system, wherein the processing unit executes the set of instructions to load and verify the method in a virtual machine; prior to execution of the method, analyze elements of the method for optimization; optimize the elements by identifying the method as a selected method that is to use a frame containing a constant pool pointer for a class of the method in response to identifying elements that can be optimized; and execute the method.

* * * * *

UNITED STATES PATENT AND TRADEMARK OFFICE
CERTIFICATE OF CORRECTION

PATENT NO.   : 6,412,108 B1
DATED        : June 25, 2002
INVENTOR(S)  : Blandy et al.

It is certified that error appears in the above-identified patent and that said Letters Patent is hereby corrected as shown below:

Column 8,
Line 48, after "loading", please delete "a" and insert -- and --.
Line 50, after "for", please delete "optimization" and insert -- optimization; --.
Line 53, after "to", please delete "used" and insert -- use --.
Line 62, after "performing", please delete "as" and insert -- an --.

Column 9,
Line 10, after "the", please delete "steps" and insert -- step --.
Line 14, after "the", please delete "micro" and insert -- macro --.
Line 36, after "performing", please delete "as" and insert -- an -- (2nd occurrence).

Column 10,
Line 10, after "a", please delete "bytecodes" and insert -- bytecode --.
Line 15, after "are", please delete "analyzing" and insert -- analyzed --.
Line 22, after "second", please delete "instruction" and insert -- instructions --.
Line 23, after "for", please delete "optimizing" and insert -- optimization --.

Signed and Sealed this

Twenty-fifth Day of February, 2003

JAMES E. ROGAN
*Director of the United States Patent and Trademark Office*